United States Patent
Guiselin et al.

(10) Patent No.: US 6,287,675 B1
(45) Date of Patent: *Sep. 11, 2001

(54) TRANSPARENT SUBSTRATE PROVIDED WITH A STACK OF THIN LAYERS

(75) Inventors: Olivier Guiselin; Jean-Pierre Brochot, both of Paris; Pascal Petit, Gagny, all of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,755

(22) Filed: Nov. 9, 1999

Related U.S. Application Data

(63) Continuation of application No. 08/903,976, filed on Jul. 31, 1997, now Pat. No. 6,042,934, which is a continuation of application No. 08/622,619, filed on Mar. 26, 1996, now abandoned, which is a continuation of application No. 08/288,007, filed on Aug. 10, 1994, now abandoned.

(30) Foreign Application Priority Data

Aug. 12, 1993 (FR) .................................................. 93 09917
Mar. 9, 1994 (FR) .................................................. 94 02723

(51) Int. Cl.$^7$ .................................................. B32B 7/02
(52) U.S. Cl. .................................. 428/213; 428/215; 428/216; 428/426; 428/428; 428/432; 428/433; 428/434; 428/469; 428/472; 428/689; 428/699; 428/701; 428/702; 428/913; 359/385; 359/389; 359/360

(58) Field of Search .................................. 428/213, 215, 428/216, 426, 428, 432, 433, 434, 469, 472, 689, 699, 701, 702, 913; 359/385, 389, 360

(56) References Cited

U.S. PATENT DOCUMENTS

| | | | |
|---|---|---|---|
| 5,153,054 | * 10/1992 | Depauw | 428/216 |
| 5,595,825 | 1/1997 | Guiselin | 428/428 |
| 5,718,980 | 2/1998 | Koch et al. | 428/428 |
| 5,800,918 | 9/1998 | Chartier et al. | 428/336 |
| 5,935,702 | 8/1999 | Macquart et al. | 428/336 |
| 5,965,246 | 10/1999 | Guiselin et al. | 428/212 |
| 6,042,934 | * 3/2000 | Guiselin et al. | 428/213 |

FOREIGN PATENT DOCUMENTS

90/02653 * 3/1990 (WO) .

* cited by examiner

*Primary Examiner*—Linda Gray
(74) *Attorney, Agent, or Firm*—Oblon, Spivak, McClelland, Maier & Neustadt, P.C.

(57) ABSTRACT

An insulated double glazing having the following layers in the following order: first dielectric layer, first layer with infrared reflection properties, second dielectric layer, second layer having infrared reflection properties, and third dielectric layer. The thickness of the first layer with infrared reflection properties is 50% to 64% of that of the second layer having infrared reflection properties.

24 Claims, 1 Drawing Sheet

TRANSPARENT SUBSTRATE PROVIDED WITH A STACK OF THIN LAYERS

This application is a Continuation of application Ser. No. 08/903,976 Filed on Jul. 31, 1997, now U.S. Pat. No. 6,042,934, which is a continuation of Ser. No. 08/622,619, filed Mar. 26, 1996 now abandoned, which is a continuation of Ser. No. 08/288,007, filed Aug. 10, 1994, now abandoned.

BACKGROUND OF THE INVENTION

1. Field of the Invention

The invention relates to transparent and in particular glass substrates covered with a stack of thin layers incorporating at least one metal layer able to reflect solar radiation and/or infrared radiation of considerable wavelength.

The invention also relates to the use of such substrates for the manufacture of solar protection or control and/or thermal insulation glazings. These glazings are used both for equipping buildings and vehicles, with a particular aim of reducing air conditioning requirements and/or reducing excessive overheating resulting from the ever-increasing size of the glazed surfaces in car bodies.

2. Discussion of the Background

A known layer stack type for giving solar protective properties to substrates is constituted by at least one metal layer, such as a silver layer, which is placed between two dielectric material layers of the metal oxide type. This stack is generally obtained by a succession of deposits carried out by a method using a vacuum such as magnetic field-assisted cathodic sputtering.

Thus, patent application WO 90/02653 discloses a laminated glazing intended for cars and whose outermost glass substrate with respect to the vehicle body is provided with a stack of five layers on its inner face in contact with the thermoplastic material interlayer. This stack consists of two silver layers intercalated with three zinc oxide layers, the silver layer closest to the outer substrate carrying the stack having a thickness slightly exceeding that of the second silver layer.

The laminated glazings according to said application are used as windscreens, which explains why they have very high light transmission values $T_L$ of approximately 75%, in order to meet the safety standards in force and therefore have a relatively high solar factor value SF. (It is pointed out that the solar factor of a glazing is the ratio between the total energy entering the room through said glazing and the incident solar energy).

The object of the invention is to develop a transparent substrate carrying a stack of thin layers having two layers which reflect radiation in the infrared and which are more particularly of a metallic type, so that they have a high selectivity, i.e. the highest possible $T_L/SF$ ratio for a given value of $T_L$, while ensuring that said substrate has an aesthetically satisfactory visual appearance in reflection.

SUMMARY OF THE INVENTION

Accordingly one object of the invention is to provide a transparent substrate, particularly of glass and having multiple thin layers, on which are successively deposited a first dielectric material layer, a first layer having infrared reflection properties and in particular based on metal, a second dielectric material layer, a second layer having infrared reflection properties, particularly based on metal, and finally a third dielectric material layer. According to the invention, the thickness of the first layer having infrared reflection properties, i.e. that closest to the carrying substrate, corresponds to about 50–80%, particularly 55 to 75% and preferably 60–70% of the thickness of the second layer having infrared reflection properties. An advantageous example corresponds to a thickness of the first layer corresponding to about 65% of the second.

This great asymmetry in the thicknesses of the layers having infrared reflection properties makes it possible to advantageously modify the values of $T_L$ and SF so as to obtain glazings having a good selectivity, i.e. a good compromise between the need for transparency and that of providing an optimum protection against solar heat rays.

Moreover, the choice of such an asymmetry leads to another advantageous consequence. Not only does it make it possible to obtain glazings having an attractive visual appearance, particularly in reflection, i.e. having a neutral "whitewashed" coloring, but the visual appearance remains virtually unchanged regardless of the angle of incidence with which the glazing is observed. This means that an external viewer of the facade of a building, entirely equipped with such glazings, does not have a visual impression of a change of shade as a function of the location on the facade at which he is looking. This characteristic of appearance in uniformity is very interesting, because it is presently highly desired by building architects.

Moreover, the visual appearance of the glazing, both in reflection and transmission, can also be refined and controlled by an adequate selection of the materials and the relative thicknesses of the three dielectric material layers.

Thus, according to a non-limiting first embodiment of the invention, the optical thickness of the first dielectric material layer is chosen to be about equal to that of the third dielectric material layer. About equal optical thicknesses is to mean within 10%, preferably within 5%, more preferably within 2.5% of the thickness of the other layer. The optical thickness of the second dielectric material layer is then advantageously chosen above or equal to 110% of the sum of the optical thicknesses of the two other dielectric material layers (i.e. the first and third layers) and preferably corresponding to about 110 to 120% of said sum.

In a second embodiment relating to the relative thicknesses of the dielectric material layers, which is advantageous, consists of choosing an optical thickness of the first dielectric material layer which exceeds the optical thickness of the third dielectric material layer. Thus, the optical thickness of the first dielectric material layer can correspond to at least 110% of the optical thickness of the third dielectric material layer, particularly at least 110 to 140%, especially 115 to 135% and preferably about 125% of the optical thickness of the latter. In the case of the drawing, it is recommended that the optical thickness of the second dielectric material layer be chosen to be about equal to the sum of the optical thicknesses of the two other dielectric material layers. About equal optical thicknesses is to mean within 10%, preferably within 5%, more preferably within 2.5% of the thickness of the other layer.

In the first and second embodiments cases, such relative proportions between the optical thicknesses of the dielectric material layers makes it possible to obtain colors in reflection and even also in transmission, which are aesthetically appreciated and in particular blue and green.

However, the second embodiment has an additional advantage compared with the first embodiment, to the extent that it optimizes the "non-sensitivity" of the complete stack to thickness variations of the different dielectric material layers forming it. This means that slight thickness variations of one of the dielectric material layers in the stack does not lead to flagrant appearance deficiencies between individual glazings or on the surface of the same glazing. This is very important from the industrial standpoint, where manufacture takes place of glazings having a considerable size and/or in large numbers with the aim of retaining appearances and performance characteristics which are as uniform as possible between individual glazing batches, particularly within individual zones of the same glazing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
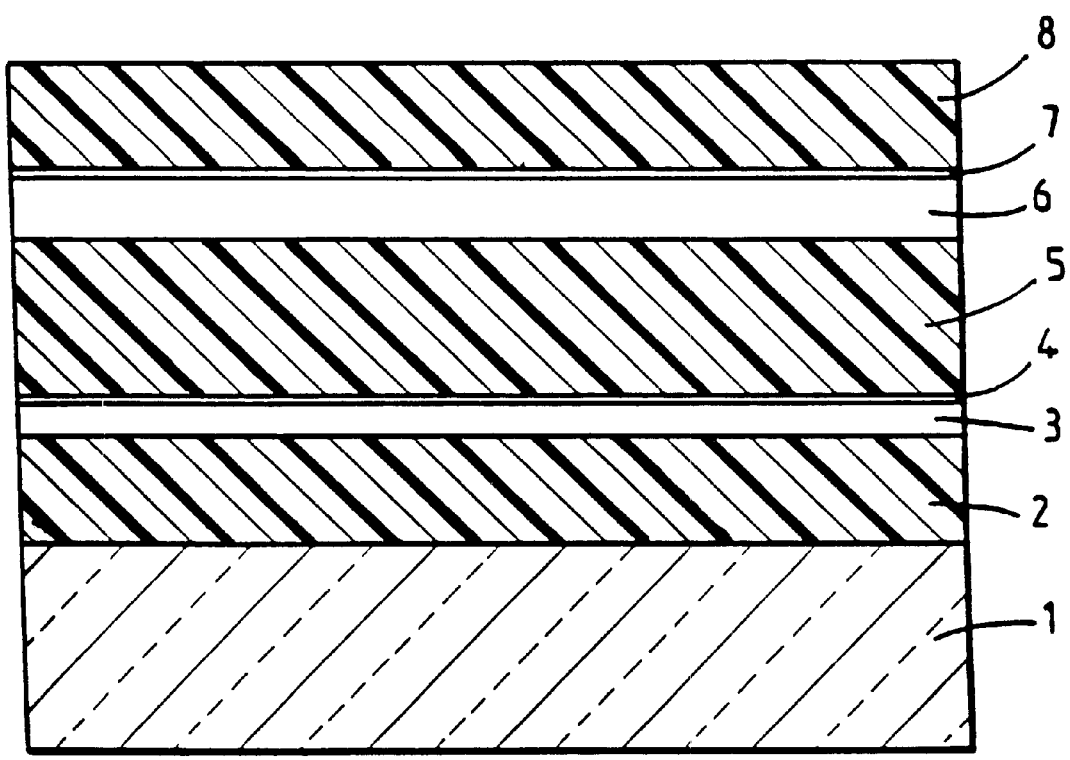
FIG. 1 displays the positional relationship of a transparent substrate according the present invention, where the relative thicknesses of the layers is not indicated.

In terms of choice of material for said thin layer stack, it is preferred to place on each of the layers having infrared reflection properties and in particular those layers based on metal, a thin "barrier" layer, particularly when the dielectric layer above the layer having infrared reflection properties is deposited by reactive cathodic sputtering in the presence of oxygen. Therefore said barrier layers protect the metal layers in contact with the oxygen and themselves partly oxidize during the deposition of the upper dielectric layer. Suitable "barrier layers" are preferably based on a tantalum, titanium or nickel-chromium alloy and have a thickness of 1 to 3 nanometers.

With regards to the layers having infrared reflection properties, good results are obtained with silver layers.

The dielectric material layers are preferably based on tantalum (V) oxide, zinc oxide, tin (IV) oxide, niobium (V) oxide, titanium (IV) oxide or a mixture of certain of these oxides. It is also possible for one of the layers to be constituted by two superimposed oxide sublayers, one being of tin (IV) oxide and the other of an oxide making it possible to improve the wetting of the layers having infrared reflection properties, such as tantalum (V) oxide or niobium (V) oxide in accordance with French patent application 93/01546 filed on Feb. 11, 1993 and European patent application 94 400 289.8 filed on Feb. 10, 1994, or titanium (IV) oxide.

Each of the oxides given above has advantages. Thus, tin (IV) oxide and zinc oxide have high deposition speeds when deposited by reactive cathodic sputtering, which is of great interest industrially. However, tantalum (V) oxide or niobium (V) oxide make it possible to obtain an increased durability of the tack with respect to mechanical or chemical aggressions and in particular lead to a better wetting of the silver layers when they are positioned below the latter. Mixed oxides can offer a compromise between the deposition rate and the durability and the superimposing of two oxide layers reconciles in an optimum manner the cost of the starting materials and a wettability of the silver layers.

There is also an additional advantage associated with the use of tantalum (V) oxide. A glazing provided with a stack having such a dielectric material can be blue both in reflection and in transmission, which is appreciated from the aesthetic standpoint and is also surprising, because usually, in transmission, the color obtained is complimentary of that obtained in reflection, when the thin layers in question are only slightly or non-absorbent.

A suitable substrate material is preferably a conventional transparent glass substrate used in optical applications, particularly such as automotive window glass and building window glass.

A preferred embodiment of the stack according to the invention consists of choosing a thickness of 7 to 9 nanometers for the first metal layer and a thickness of 11 to 13 nanometers for the second. Preferably the optical thickness of the first and third dielectric material layers is between 60 and 90 nanometers, their geometrical thickness being in particular between 30 and 45 nanometers. The optical thickness of the second layer is between 140 and 170 nanometers, while its geometrical thickness is between 70 and 80 nanometers. It is pointed out that the optical thickness, as it refers to the dielectric material layers, is defined in a conventional manner by the product of the real geometrical thickness of the dielectric material layer and the refractive index of the dielectric material forming it. As a function of the envisaged oxide type, the index varies between 1.9 and 2.1 for tin (IV) oxide or tantalum (V) oxide and to about 2.3 for oxides of the niobium (V) oxide type.

The transparent substrate coated with the stack according to the invention can advantageously be incorporated into a multiple glazing and in particular as one of the glass layers of an insulating double glazing. In the latter case, the double glazing has a light transmission value ($T_L$) between 60 and 70% and a solar factor SF of 0.32 to 0.42, which make it completely suitable for use in buildings. Moreover, it preferably has in reflection, a virtually unchanged visual appearance, no matter what the vision incidence angle, the values of a*, b* in the colorimetry system (L, a*, b*, c*) remaining unchanged, below 3 and negative.

It can also form part of a laminated glazing with, in particular, a light transmission of about 70%.

Other features of the invention will become apparent in the course of the following descriptions of the exemplary embodiments which are given for illustration of the invention and are not intended to be limiting thereof.

In all the examples, the successive deposits of the layers of the stack was performed by magnetic field-assisted cathodic sputtering, however, any other deposition procedure can be practiced provided that it permits a good control and monitoring of the thicknesses of the layers to be deposited.

The substrates on which the stacks are deposited were 4 mm thick soda-lime-silica glass substrates, except for Examples 7 to 10, where the substrates were 6 mm thick. In double glazings, they were assembled with another substrate identical to the first, but in the blank state, by means of a 10 mm space of gas, except for the Examples 7 to 8, where there was a 12 mm space of gas.

FIG. 1 shows the stack according to the invention and does not respect proportions with respect to the thicknesses of the layers so as to facilitate understanding. It is possible to see the previously defined substrate 1, surmounted by a first tin (IV) oxide or tantalum (V) oxide dielectric material layer 2, a first silver infrared reflective layer 3, a titanium or Ni—Cr alloy barrier alloy (partly oxidized) 4, a second tin (IV) or tantalum (V) oxide dielectric material layer 5, a second silver infrared reflective layer 6, another barrier alloy layer 7 identical to the first barrier alloy layer 4 and finally a last dielectric material layer 8 of one of the same oxides.

A suitable deposition apparatus comprises at least one sputtering chamber equipped with cathodes having targets made from appropriate materials under which the substrate 1 successively passes. Suitable deposition conditions for each of the layers are as follows:

The silver-based layers 3, 6 may be deposited with the aid of a silver target, under a pressure of 0.8 Pa in an argon atmosphere, the layers 2, 5 and 8, when based on $SnO_2$, may be deposited by reactive sputtering with the aid of a tin target under a pressure of 0.8 Pa and in an argon/oxygen atmosphere, including 36 vol. % oxygen.

The layers 2, 5, 8, when based on $Ta_2O_5$ or $Nb_2O_5$ may be deposited by reactive sputtering respectively with the aid of a tantalum target or a niobium target under a pressure of 0.8 Pa and in an argon/oxygen atmosphere, whereof about 10 vol. % is oxygen.

The layers 4, 7 based on Ni—Cr or titanium may be deposited with the aid of a nickel-chromium alloy or titanium target under the same pressure and in an argon atmosphere.

The power densities and travel speeds of the substrate 1 may be adjusted in a known manner so as to obtain the desired layer thicknesses.

In all the following Examples, with the exception of the last, tantalum (V) oxide is chosen as the dielectric material for the layers 2, 5 and 8.

EXAMPLES 1 to 5

Examples 1, 2 and 5 are comparative examples to the extent that in these three cases, the silver layers 3 and 6 have either virtually identical thicknesses (Example 1) or different thicknesses, but where the asymmetry is reversed compared with that of the invention (Examples 2 and 5). Examples 3 and 4 are in accordance with the teachings of the present invention.

The following Table 1 gives for each of the Examples the nature and thicknesses (in nanometers) of the layers of the stack in question. The barrier layers 4 and 7 are designated Ni—Cr, knowing that they are in fact partly oxidized once all the layers have been deposited.

TABLE 1

|  |  | Ex. 1 | Ex. 2 | Ex. 3 | Ex. 4 | 5 |
|---|---|---|---|---|---|---|
| Glass | (1) | — | — | — | — | — |
| $Ta_2O_5$ | (2) | 36.5 | 34.5 | 32 | 32 | 32 |
| Ag | (3) | 10 | 11.5 | 8 | 8 | 12 |
| Ni-Cr | (4) | 2 | 2 | 2 | 3 | 2 |
| $Ta_2O_5$ | (5) | 77.5 | 94.5 | 77.5 | 72.5 | 77.5 |
| Ag | (6) | 11 | 8 | 12 | 12.5 | 8 |
| Ni-Cr | (7) | 2 | 2 | 2 | 2 | 2 |
| $Ta_2O_5$ | (8) | 33.5 | 35 | 33.5 | 32 | 33.5 |

The following Table 2 indicates for each of the above Examples the light transmission value $T_L$ as a percentage, the solar factor SF calculated according to DIN standard 67507 (Appendix A 233) as a percentage, the dominant wavelength values lambda-dom-t nanometers and the associated coloring purity (p.t.) as a percentage. Also indicated are the light reflection values $R_L$ as a percentage, the dominant wavelength in reflection lambda-dom-r and the reflection purity (p.r.) as a percentage, the colorimetry measurements having been performed under normal incidence. All the measurements relate to the substrate fitted as a double glazing, with reference to the illuminant $D_{65}$.

TABLE 2

|  | Ex. 1 | Ex. 2 | Ex. 3 | Ex. 4 | Ex. 5 |
|---|---|---|---|---|---|
| $T_L$ | 69 | 66 | 70 | 61 | 62 |
| SF | 42 | 42 | 42 | 38 | 38 |
| Lambda-dom-t | 493 | 489 | 498 | 490 | 478 |
| p.t. | 2 | 5 | 2 | 4 | 6 |
| $R_L$ | 12 | 19 | 10 | 10 | 21 |
| Lambda-dom-r | 561 | 641 | 486 | 487 | 574 |
| p.r. | 3 | 9 | 3 | 6 | 35 |

The following Table 3 gives the values of the dominant wavelength in reflection lambda-dom-r, the reflection purity p.r. for some of the preceding examples (the substrate still being installed in a double glazing), but on this occasion measured with an angle of incident relative to the perpendicular to the plane of the substrate of respectively 60 and 700.

TABLE 3

|  | Ex. 1 | Ex. 2 | Ex. 3 | Ex. 5 |
|---|---|---|---|---|
| Lambda-dom-r (60°) | 470 | 569 | 480 | 571 |
| p.r. (60°) | 5.4 | 3 | 4.68 | 8 |
| $R_L$ (60°) | 19 | 28 | 20 | 27 |
| Lambda-dom-r (70°) | 462 | 490 | 481 | −498 |
| p.r. (70°) | 4.3 | 4 | 3.0 | 0.8 |
| $R_L$ (70°) | 32 | 39 | 34 | 36 |

Other colorimetry measurements with incidence angles 0° and 60° were performed, on this occasion in the system (L*, a*, b*), for Examples 2 and 3, as well as for example 5, which is in all points identical to example 3, except that the silver layers 3 and 6 were reversed and consequently falling outside the conditions recommended by the invention. Table 4 groups the values of a* and b*, as well as c* called saturation and equal to the square root of the sum of the squares of a* and b*.

TABLE 4

|  | Ex. 2 | Ex. 3 | Ex. 5 |
|---|---|---|---|
| a* (0°) | 12.2 | −0.9 | −2.2 |
| b* (0°) | 3.1 | −3.1 | 22 |
| c* (0°) | 12.6 | 3.2 | 22.1 |
| a* (60°) | −1 | −0.9 | −1.7 |
| b* (60°) | 2 | −3 | 6 |
| c* (60°) | 2.2 | 3.13 | 6.2 |

The following conclusions can be drawn from this information.

Under a normal incidence angle, i.e., giving different thicknesses to the silver layers and solely in such a way that the silver layer closest to the substrate is much thinner, enables the obtaining of glazings which are blue in reflection.

It should be noted that the glazings according to the invention, particularly when the chosen dielectric is tantalum (V) oxide, are also blue in transmission.

Thus, only Examples 3 and 4 have lambda-dom-r values of approximately 486 nanometers and lambda-dom-t values of 490 nanometers, according to Table 2. However, the glazings of Examples 1 and 5 have in reflection a yellow shade, whereas that of Example 2 is a red-purple shade.

In addition, the coloring purity in reflection p.r. of Example 2, close to 10%, is much higher than that of Examples 3 and 4 according to the invention. (This value of p.r. is even higher for Example 5).

Moreover, the glazings of Examples 3 and 4 according to the invention have a good selectivity of at least 1.6 or 1.7 with a solar factor remaining equal to or below 42%.

Thus, the obtaining of a favorable colorimetry according to the invention is not to the detriment of the solar protection performance characteristics of the glazings in question.

Tables 3 and 4 make it possible to evaluate the uniformity of the appearance in reflection of the glazings according to certain of the preceding examples. Table 3 shows that the glazing according to Example 3 in accordance with the invention retains a blue color in reflection, with a lambda-dom-r value remaining virtually constant towards 486 at 0° to 481 at 70°, the purity in reflection also remaining very moderate.

However, the glazing according to Example 1, where the silver layers approximately have the same thickness, passes from a yellow color in reflection under normal incidence to a blue and then violet color at 60° and then 70°.

Table 4 confirms that only Example 3 according to the invention makes it possible to maintain an identical colored appearance in reflection no matter what the incidence angle, because the values of a* and b* remain virtually unchanged, as does the saturation c*.

This is not the case with the glazings of Examples 2 and 5, where the values of a* and b* change completely as a function of the incidence angle. Thus, the value of a* passes, for the glazing of Example 2, from a very high positive value of 12.2 at 0° to a very low negative value of −1 at 60°.

Thus, only the examples according to the invention reconcile the selectivity and appearance uniformity.

EXAMPLES 6 and 7

These two examples use as the dielectric material tin (IV) oxide and not tantalum (V) oxide and use for the barrier layers either titanium (Example 6) or Ni—Cr (Example 7).

The following Table 5 indicates the thickness values in nanometers used for each of the stack layers:

TABLE 5

|  |  | Ex. 6 | Ex. 7 |
|---|---|---|---|
| Glass | (1) | — | — |
| SnO$_2$ | (2) | 34 | 32 |
| Ag | (3) | 8 | 8 |
| Ti or Ni-Cr | (4) | 1 | 1.5 |
| SnO$_2$ | (5) | 77 | 74.5 |
| Ag | (6) | 12 | 11.6 |
| Ti or Ni-Cr | (7) | 1 | 1.5 |
| SnO$_2$ | (8) | 35 | 33 |

The thus coated substrates were installed in double glazings, as explained hereinbefore. The photometric measurements on the double glazings appear in Table 6 (measurements under normal incidence).

TABLE 6

|  | Ex. 6 | Ex. 7 |
|---|---|---|
| T$_L$ | 66 | 65 |
| SF | 38 | 39 |
| R$_L$ | 10.4 | 9.4 |
| lambda-dom-r | 511 | 484 |
| p.r | 2 | 2 |

TABLE 6-continued

|  | Ex. 6 | Ex. 7 |
|---|---|---|
| a* | — | −0.5 |
| b* | — | −1.1 |

These glazings, like those of Examples 3 and 4, reveal no significant modification of their visual appearance in reflection, no matter what the measurement angle. In reflection they have a color towards the greens for Example 6 and towards the blues for Example 7, but these colors remain very neutral, in view of the very low purity values associated therewith.

Laminated glazings incorporating the covered substrates of the stack according to the invention retain the favorable colorimetry observed in the case of monolithic substrates or substrates installed in double glazings.

Thus, the substrate covered with the stack according to Example 3 was assembled with another substrate of the same type, but without a layer, using standard, 0.3 mm thick, polyvinyl butyral film.

The following Table 7 give for said laminated glazing the already explained values of T$_L$, p.t. lambda-don-t, a* and b* in connection with the appearance in transmission, as well as the corresponding values R$_L$, p.r. lambda-don-r, a* and b* concerning the appearance in reflection on the side of the substrate provided with the stack of layers (same units as hereinbefore).

TABLE 7

| T$_L$ | 70 |
|---|---|
| p.t. | 1.2 |
| lambda-dom-t | 502 |
| a* | −3.27 |
| b* | 0.52 |
| R$_L$ | 14 |
| p.r. | 8 |
| lambda-dom-r | 483 |
| a* | −2.2 |
| b* | −4.4 |

Table 7 shows that the incorporation of substrates covered in accordance with the invention in a laminated glazing structure leads to no deterioration of their aesthetic colorimetry. The thus obtained laminated glazing remains in the blues or greens, both in transmission and in reflection.

Examples 3, 4 and 6 according to the invention relate to its "first variant" mentioned hereinbefore, i.e., respecting a choice of relative thicknesses between the three oxide layers 2, 5 and 8 which is specific and approximately as follows. The thickness of the layer 2 is approximately as follows. The thickness of the layer 2 is approximately equal to that of the layer 8 and the thickness of the layer 5 (in the center) is slightly greater than the sum of the thicknesses of the two other layers 2 and 8 (in these examples reference can be made to either the geometrical thickness or the optical thickness, because the three layers are made from the same oxide).

The "second variant" according to the invention will now be illustrated by the following example and more particularly Example 8. In this variant, the thickness ratios between the oxide layers 2, 5 and 8 are slightly modified, the optical thickness of the layer 2 being significantly (25%) higher than that of the layer 8. The optical thickness of the layer 5 (or the sum of the optical thicknesses of the different sublayers forming it) is here approximately equal to the sum of the optical thicknesses of the two other layers 2 and 8.

EXAMPLE 8

The substrate according to Example 8 is covered with a stack similar to that described for Example 7, the layers 2, 5 and 8 being of tin (IV) oxide, but of different thicknesses.

The following Table 8 gives the thickness values in nanometers of all the layers of the stack in question.

TABLE 8

|  |  | Ex. 8 |
| --- | --- | --- |
| Glass | (1) | — |
| $SnO_2$ | (2) | 41 |
| Ag | (3) | 8 |
| Ni-Cr | (4) | 1.5 |
| $SnO_2$ | (5) | 74.5 |
| Ag | (6) | 12 |
| Ni-Cr | (7) | 1.5 |
| $SnO_2$ | (8) | 33 |

The substrate is fitted in a double glazing. The photometric measurements performed on the double glazing are given in table 9 (measured under normal incidence).

TABLE 9

|  | Ex. 8 |
| --- | --- |
| $T_L$ | 65 |
| SF | 39 |
| $R_L$ | 9.1 |
| Lambda-dom-r | 486 |
| p.r. | 1 |
| a* | -0.7 |
| b* | -0.5 |

Comparing these results with those obtained in Example 7, it can be seen that identical values of $T_L$ and SF are obtained. The appearance in reflection is also in the blues, with an even more neutral color, because the purity is approximately 1% and the values of a* and b* are both well below 1. Another advantage of the stack type according to Example 7 is that it more easily permits slight thickness variations in the stack layers, from one point to the other of the substrate, without giving rise to noticeable modifications of its visual appearance.

Thus, on performing measurements of a* and b* in reflection at different points of the substrate according to Example 8 fitted in a double glazing, it is found that the value differences remain below 1, i.e. differences which cannot be noticed by the human eye, even if each of the layers has local thickness variations of +/−4%. This is very important from the industrial standpoint, because it makes it more easily possible to obtain glazings which are both uniform, i.e. having no local appearance modifications, and reproducible, i.e. having an identical appearance between individual glazings or between individual glazing batches. This means that for a given production line, which has its own performance limits, particularly with regards to the regularity of the layers obtained, such a stack will be less "sensitive" than others to thickness variations of the layers imposed by the line and will consequently have a better optical quality.

Conversely, on imposing a given optical quality, it is possible with this type of stack, to use a production line under less draconian conditions or to use a production line having slightly inferior performance characteristics.

It is also advantageous from the industrial standpoint for the layer 5 to have a thickness roughly equal to the sum of the thicknesses of the layers 2 and 8. Thus, it is then sufficient to use two targets, here of tin, whereof it is possible to regulate the power values supplied "once and for all" in their respective deposition chambers. The layer 2 is then obtained by the passage of the substrate under one of the targets with settings permitting the deposition of a predefined adequate thickness. In the same way, the layer 8 is obtained by the passage of the substrate under the second target with settings make it possible to obtain the deposition of a previously defined adequate thickness. The layer 5 is obtained by consecutive passages of the substrate under each of the targets, so that on the substrate are superimposed a layer thickness corresponding to that of the layer 2 or 8 and then a layer thickness corresponding to that of the layer 8 or 2, i.e. the sum of the thicknesses of these two layers is formed without calling on a third target.

EXAMPLES 9 to 12

The aim of these examples is to optimize the wettability and therefore the performance characteristics of at least one of the silver layers. They follow the teaching of European patent application 94 400 289.8.

In the case of Examples 9 and 10, the layers 2 and 8 are once again of tin (IV) oxide, but the layer 5 is subdivided into two superimposed bislayers, the first 5 being of tin (IV) oxide and the second 5 bis of tantalum (V) oxide (for Example 9) or niobium (V) oxide (for Example 10). A thin metallic sublayer can be optionally provided below the silver layer 6 and which is of NiCr or Sn.

In the case of Examples 11 and 12, the layer 2 is also subdivided into two superimposed sublayers, the first 2 being of tin (IV) oxide and the second 2 bis of tantalum (V) oxide (for Example 11) or niobium (V) oxide (for Example 12). An optional, thin metallic sublayer can be provided beneath the silver layer 3.

Thus, in the case of Examples 9 and 10, the wettability of the second silver layer 6 is optimized, whereas in the case of Examples 11 and 12, the wettability of the two silver layers 3 and 6 is optimized.

Table 10 gives the thicknesses in nanometers of the layers present.

TABLE 10

|  |  | Ex. 9 and 10 | Ex. 11 and 12 |
| --- | --- | --- | --- |
| Glass | (1) | — | — |
| $SnO_2$ | (2) | 41 | 30–31 |
| $Ta_2O_5$ or $Nb_2O_5$ | (2 bis) | 0 | 10 |
| Ag | (3) | 8 | 8 |
| Ni-Cr | (4) | 1.5 | 1.5 |
| $SnO_2$ | (5) | 64 | 64 |
| $Ta_2O_5$ or $Nb_2O_5$ | (5 bis) | 10 | 10 |
| Ag | (6) | 12 | 12 |
| Ni-Cr | (7) | 1.5 | 1.5 |
| $SnO_2$ | (8) | 33 | 33 |

There is a slight improvement to the solar control performance characteristics of the stacks. Moreover, the use of oxides known for their hardness, such as tantalum or niobium (V) oxide, helps to optimize the durability of the overall stack and in particular its mechanical durability. This mechanical strength increase is particularly pronounced for Examples 11 and 12.

In conclusion, the glazings according to the invention have both a good selectivity of about 1.70, a uniform visual appearance which is attractive to the eye (particularly a blue or green color in reflection and optionally also in transmission), as well as a range of light transmission values making them suitable for use as solar control glazings in buildings, particularly in the form of double glazings, the stack of thin layers preferably being on face 2 (the faces are conventionally numbered from the outside to the inside of the room in question).

The substrates covered with layers according to the invention can also be used with advantage for producing laminated glazings.

Obviously, numerous modifications and variations of the present invention are possible in light of the above teachings. It is therefore to be understood that within the scope of the appended claims, the invention may be practiced otherwise than as specifically described herein.

This application is based on French patent applications FR 93/09917 filed in France on Aug. 12, 1993 and FR 94/02723 filed in France on Mar. 9, 1994, the entire contents of which of each are hereby incorporated by reference. What is claimed as new and desired to be secured by Letters Patent of the United States is:

What is claimed is:

1. An insulating double-glazing having a light transmission ($T_L$) between 60 and 70% and a solar factor of 0.32–0.42, and a color in external reflection in the blues or greens, which comprises:
   a) a first layer, and
   b) a second layer, which is a transparent substrate having multiple thin layers, comprising successively:
      i) a first dielectric layer on said substrate;
      ii) a first layer having infrared reflection properties on said layer i);
      iii) a second dielectric material layer on said layer ii);
      iv) a second layer having infrared reflection properties on said layer iii); and
      v) a third dielectric material layer, wherein a thickness of said first layer having infrared reflection properties is 60–70% of said second layer having infrared reflection properties.

2. The insulating double-glazing of claim 1, wherein an optical thickness of said second dielectric material layer of said second layer (b) is equal to or greater than 110% of the sum of the optical thicknesses of said first and third dielectric material layers of said second layer (b).

3. The insulating double-glazing of claim 2, wherein the optical thicknesses of the first dielectric material layer and said third dielectric material layer are about equal.

4. The insulating double-glazing of claim 1, wherein the optical thickness of said first dielectric material layer is greater than the optical thickness of the third dielectric material layer, and wherein the optical thickness of the first layer corresponds to at least 110% of the optical thickness of the third layer.

5. The insulating double-glazing of claim 4, wherein the optical thickness of said second dielectric material layers is about equal to the sum of the optical thicknesses of the first and third dielectric layers.

6. The insulating double-glazing of claim 1, wherein each of said layers of said second layer (b) having infrared reflection properties is surmounted by a partly oxidized barrier metal layer.

7. The insulating double-glazing of claim 1, wherein each of said layers of said transparent substrate having infrared reflection properties contains silver.

8. The insulating double-glazing of claim 1, wherein at least one of said dielectric material layers on said transparent substrate is a material selected from the group consisting of tantalum (V) oxide, tin (IV) oxide, zinc oxide, niobium (V) oxide, titanium (IV) oxide and mixtures of said oxides.

9. The insulating double-glazing of claim 1, wherein each of said dielectric material layers or said transparent substrate is a material selected from the group consisting of a first layer of tin (IV) oxide surmounted by a second layer of tantalum (V) oxide, niobium (V) oxide or titanium (IV) oxide.

10. The insulating double-glazing of claim 1, wherein the thickness of said first layer having infrared reflection properties is between 7 and 9 nanometers.

11. The insulating double-glazing of claim 1, wherein the thickness of said second layer of said transparent substrate having infrared reflection properties is between 11 and 13 nanometers.

12. The insulating double-glazing of claim 6, wherein said barrier metal layer contains a material selected from the group consisting of titanium and nickel-chromium alloy.

13. An insulating double-glazing having a light transmission ($T_L$) between 60 and 70% and a solar factor of 0.32–0.42, and a color in external reflection in the blues or greens, which comprises:
   a) a first layer; and
   b) a second layer thereon, which is a transparent rigid substrate having multiple thin layers thereon, comprising successively:
      i) a first dielectric material layer on said substrate;
      ii) a first layer having infrared reflection properties on said layer i);
      iii) a second dielectric material layer on said layer ii);
      iv) a second layer having infrared reflection properties on said layer iii); and
      v) a third dielectric material layer on said layer iv);
   wherein a thickness of said first layer having infrared reflection properties is 50–64% of that of said second layer having infrared reflection properties.

14. The insulating double-glazing of claim 13, wherein an optical thickness of said second dielectric material layer of said second layer (b) is equal to or greater than 110% of the sum of the optical thicknesses of said first and third dielectric material layers.

15. The insulating double-glazing of claim 13, wherein the optical thicknesses of the first dielectric material layer and said third dielectric material layer are about equal.

16. The insulating double-glazing of claim 13, wherein the optical thickness of said first dielectric material layer is greater than the optical thickness of the third dielectric material layer, and wherein the optical thickness of the first layer corresponds to at least 110% of the optical thickness of the third layers.

17. The insulating double-glazing of claim 16, wherein the optical thickness of said second dielectric material layers is about equal to the sum of the optical thicknesses of the first and third dielectric layers.

18. The insulating double-glazing of claim 13, wherein each of said layers of said second layer (b) having infrared reflection properties is surmounted by a partly oxidized barrier metal layer.

19. The insulating double-glazing of claim 13, wherein each of said layers of said transparent substrate having infrared reflection properties contains silver.

20. The insulating double-glazing of claim 13, wherein at least one of said dielectric material layers on said transparent substrate is a material selected from the group consisting of tantalum (V) oxide, tin (IV) oxide, zinc oxide, niobium (V) oxide, titanium (IV) oxide and mixtures of said oxides.

21. The insulating double-glazing of claim 13, wherein each of said dielectric material layers or said transparent substrate is a material selected from the group consisting of a first layer of tin (IV) oxide surmounted by a second layer of tantalum (V) oxide, niobium (V) oxide or titanium (IV) oxide.

22. The insulating double-glazing of claim 13, wherein the thickness of said first layer having infrared reflection properties is between 7 and 9 nanometers.

23. The insulating double-glazing of claim 13, wherein the thickness of said second layer of said transparent substrate having infrared reflection properties is between 11 and 13 nanometers.

24. The insulating double-glazing of claim 18, wherein said barrier metal layer contains a material selected from the group consisting of titanium and nickel-chromium alloy.

* * * * *